United States Patent
Novlan et al.

(10) Patent No.: US 11,196,532 B2
(45) Date of Patent: *Dec. 7, 2021

(54) SUPPLEMENTARY UPLINK WITH LTE COEXISTENCE ADJACENT TO FREQUENCY DIVISION DUPLEX SPECTRUM FOR RADIO NETWORKS

(71) Applicant: AT&T Intellectual Property I, L.P., Atlanta, GA (US)

(72) Inventors: Thomas Novlan, Austin, TX (US); Ralf Bendlin, Cedar Park, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 159 days.

This patent is subject to a terminal disclaimer.

(21) Appl. No.: 16/797,010

(22) Filed: Feb. 21, 2020

(65) Prior Publication Data

US 2020/0195412 A1    Jun. 18, 2020

Related U.S. Application Data

(63) Continuation of application No. 15/958,138, filed on Apr. 20, 2018, now Pat. No. 10,608,805.

(51) Int. Cl.
*H04B 7/005* (2006.01)
*H04L 5/14* (2006.01)
(Continued)

(52) U.S. Cl.
CPC .......... *H04L 5/1423* (2013.01); *H04L 5/1469* (2013.01); *H04Q 11/02* (2013.01); *H04L 5/0012* (2013.01); *H04W 72/1284* (2013.01)

(58) Field of Classification Search
USPC ....... 370/230, 252, 276, 278, 280, 281, 294, 370/295, 328, 329, 330, 331, 436, 465,
(Continued)

(56) References Cited

U.S. PATENT DOCUMENTS 9,184,886 B2    11/2015    Bontu et al.
9,270,430 B2    2/2016    Guo et al.
(Continued)

FOREIGN PATENT DOCUMENTS

WO    2016/141519 A1    9/2016
WO    2016195585 A1    12/2016
(Continued)

OTHER PUBLICATIONS

Huawei, "WF on UL sharing aspects," 3GPP TSG RAN plenary meeting #77 RP-172083, Sapporo, Japan, Sep. 11-14, 2017, 7 pages.
(Continued)

*Primary Examiner* — Nguyen H Ngo
(74) *Attorney, Agent, or Firm* — Amin, Turocy & Watson, LLP

(57) ABSTRACT

The described technology is generally directed towards using a frequency-separated band as a supplementary uplink band for a new radio downlink band that cannot operate as a time division duplex band and otherwise has no paired uplink band. The paired bands are separated in frequency, yet operate in the time division duplex mode. The supplementary uplink for New Radio facilitates coexistence with LTE in the frequency division duplex spectrum.

20 Claims, 10 Drawing Sheets

(51) Int. Cl.
*H04Q 11/02* (2006.01)
*H04W 72/12* (2009.01)
*H04L 5/00* (2006.01)

(58) Field of Classification Search
USPC .................................................... 370/468
See application file for complete search history.

(56) References Cited

U.S. PATENT DOCUMENTS

| | | | |
|---|---|---|---|
| 9,419,776 | B2 | 8/2016 | Gauvreau et al. |
| 9,572,047 | B2 | 2/2017 | Faerber |
| 9,743,409 | B2 | 8/2017 | Seo et al. |
| 9,801,161 | B2 | 10/2017 | Marinier et al. |
| 9,872,287 | B2 | 1/2018 | Golitschek et al. |
| 2010/0290369 | A1 | 11/2010 | Hui et al. |
| 2011/0176430 | A1 | 7/2011 | Zetterberg et al. |
| 2012/0252477 | A1 | 10/2012 | Rao |
| 2015/0188650 | A1 | 7/2015 | Au et al. |
| 2015/0281974 | A1 | 10/2015 | Ghasemzadeh et al. |
| 2015/0326378 | A1 | 11/2015 | Zhang et al. |
| 2016/0242128 | A1 | 8/2016 | Loehr et al. |
| 2017/0085346 | A1 | 3/2017 | Tiirola et al. |
| 2017/0164310 | A1 | 6/2017 | Jeong et al. |
| 2017/0188314 | A1 | 6/2017 | Mueck et al. |
| 2017/0279646 | A1 | 9/2017 | Yi et al. |
| 2017/0295589 | A1 | 10/2017 | Sundararajan et al. |
| 2018/0084550 | A1 | 3/2018 | Chen et al. |
| 2018/0234959 | A1 | 8/2018 | Ahn et al. |
| 2018/0316481 | A1* | 11/2018 | Montojo ............ H04L 5/003 |
| 2018/0368153 | A1* | 12/2018 | Li ....................... H04W 72/12 |
| 2018/0376510 | A1 | 12/2018 | Sun et al. |
| 2019/0150052 | A1 | 5/2019 | Wang et al. |
| 2019/0182015 | A1 | 6/2019 | Cui |

FOREIGN PATENT DOCUMENTS

| | | |
|---|---|---|
| WO | 2017032408 A1 | 3/2017 |
| WO | 2017135991 A1 | 8/2017 |
| WO | 2017173133 A1 | 10/2017 |
| WO | 2017213386 A1 | 12/2017 |
| WO | 2018004641 A1 | 1/2018 |
| WO | 2018031638 A1 | 2/2018 |
| WO | 2018031746 A1 | 2/2018 |

OTHER PUBLICATIONS

Author Unknown, "Discussion on NR-LTE Co-existence," 3GPP TSG RAN WG1 Meeting#88 R1-1701618 Athens, Greece Feb. 13-17, 2017, 11 pages.

International Search Report and Written Opinion received for PCT Application Serial No. PCT/US2019/025454 dated Aug. 12, 2019, 17 pages.

Ericsson, "On Duplexing in Paired Spectrum", URL: http://www.3gpp.org/ftpfMeetings_3GPP_SYNC/RAN1/Docs/, 3GPP TSG RAN WG1 Meeting NR#3, R1-1716236, Sep. 18-21, 2017, 4 pages.

Office Action for U.S. Appl. No. 15/958,138 dated Jul. 3, 2019, 37 pages.

Notice of Allowance for U.S. Appl. No. 15/958,138 dated Nov. 22, 2019, 31 pages.

* cited by examiner

SUPPLEMENTARY UPLINK WITH LTE COEXISTENCE ADJACENT TO FREQUENCY DIVISION DUPLEX SPECTRUM FOR RADIO NETWORKS

RELATED APPLICATION

The subject patent application is a continuation of, and claims priority to, U.S. patent application Ser. No. 15/958,138, filed Apr. 20, 2018, and entitled "SUPPLEMENTARY UPLINK WITH LTE COEXISTENCE ADJACENT TO FREQUENCY DIVISION DUPLEX SPECTRUM FOR RADIO NETWORKS," the entirety of which application is hereby incorporated by reference herein.

TECHNICAL FIELD

The subject application is related to wireless communication systems, and, for example, to supplementary uplink operation for New Radio (5G) with LTE coexistence adjacent to frequency division duplex spectrum to provide efficient 5G network deployments.

BACKGROUND

In wireless communication systems, the network may choose to deploy New Radio (NR, often referred to as 5G) on adjacent or overlapping spectrum with LTE, i.e., NR waveforms and LTE waveforms are either transmitted on adjacent carriers/bands or on the same carrier/band. For the case where NR and LTE are deployed on adjacent carriers/bands, because of the way spectrum is allocated, a time division duplex (TDD) New Radio band is sometimes allocated next to a frequency division duplex (FDD) LTE band.

When this occurs, because of the possibility of out-of-band interference, there needs to be a guard band between the TDD New Radio band and the FDD LTE band, as otherwise the New Radio band cannot be used as a time division duplex (TDD) mode band. What results is a New Radio FDD downlink or TDD supplementary downlink (SDL) band that can be referred to as a "standalone" or "orphaned" band in that it has no corresponding uplink frequency. However, for a band to be of practical use for communications with user equipment, both downlink and uplink communications are needed.

BRIEF DESCRIPTION OF THE DRAWINGS

The technology described herein is illustrated by way of example and not limited in the accompanying figures in which like reference numerals indicate similar elements and in which.

DETAILED DESCRIPTION

Briefly, one or more aspects of the technology described herein are generally directed towards using a frequency-separated supplementary band as an uplink band for an otherwise orphaned downlink band. Moreover, even though the paired bands are separated in frequency, the bands can be configured to operate in the time division duplex (TDD) mode, (instead of the frequency division duplex, or FDD mode), thereby being more efficient with respect to time slot usage.

In general, a user equipment can be configured to have two uplink carriers for one downlink carrier, one of which is a supplementary uplink; the user equipment selects the supplementary uplink if the measured quality of the downlink signal is lower than a broadcast threshold. In one or more aspects, as described herein a user equipment is instructed to use the supplementary uplink carrier for uplink data transmissions, (because there are no practical uplink resources available on the downlink carrier). The instruction to use the supplementary uplink carrier may be accomplished by setting the threshold to its maximum value, by explicit indication, or other implicit techniques.

The technology thus provides a new mode of operation, in which a network and user equipment basically operate in frequency division duplex mode with different frequencies, but use time division duplex signaling. This allows an otherwise orphaned band to be used as a downlink band for communications that need both downlink and uplink transmissions.

It should be understood that any of the examples and terms used herein are non-limiting. For instance, some examples are based on New Radio/5G communications between a user equipment exemplified as a smartphone or the like and network device; however virtually any communications devices may benefit from the technology described herein, and/or their use in different spectrums may likewise benefit. Further, other radio technology, including future radio technology beyond 5G, may benefit from the technology described herein. Thus, any of the embodiments, aspects, concepts, structures, functionalities or examples described herein are non-limiting, and the technology may be used in various ways that provide benefits and advantages in radio communications in general.

Figure 1:
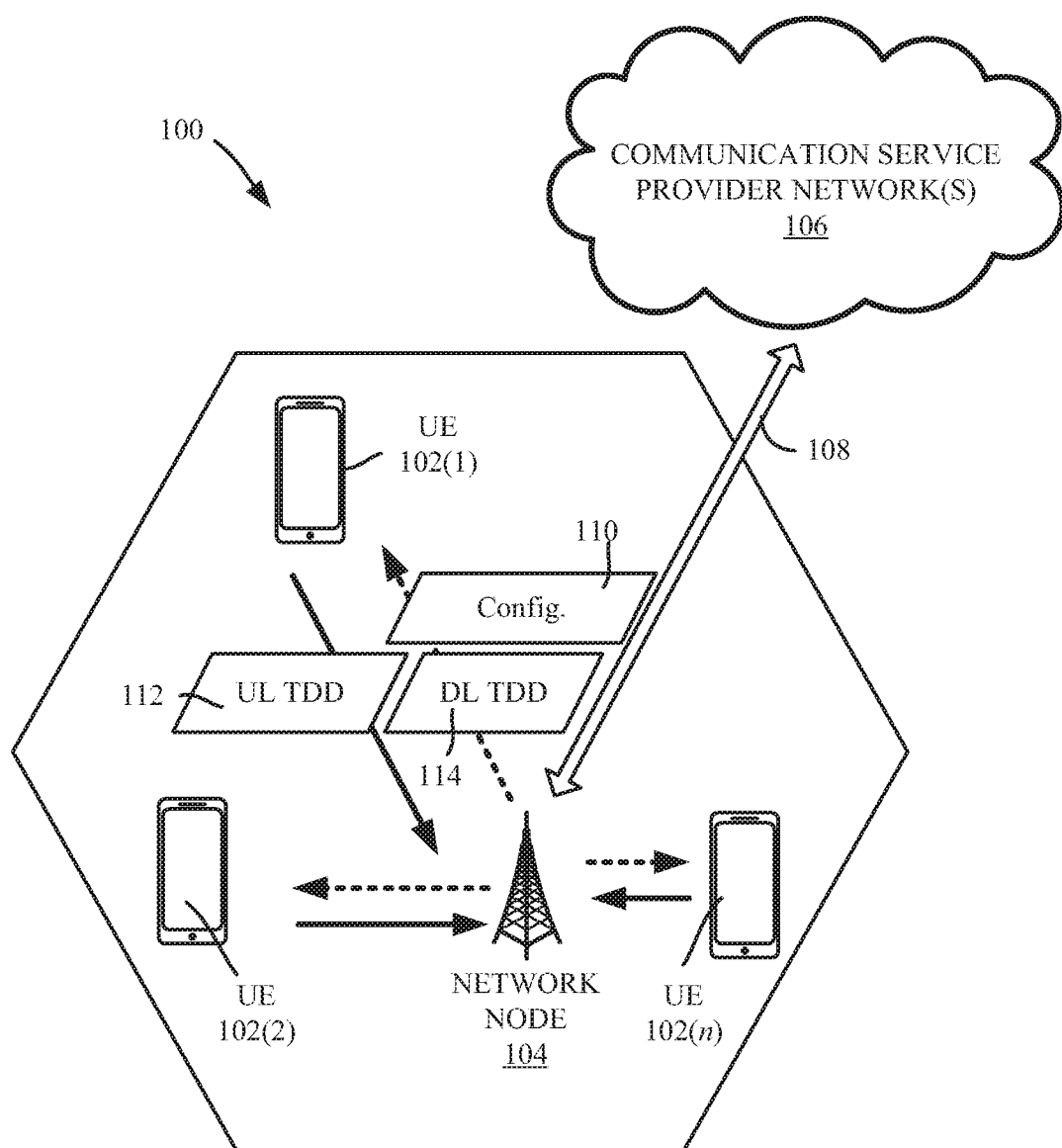
FIG. 1 illustrates an example wireless communication system in which a network node device (e.g., network node) and user equipment (UE) can implement various aspects and implementations of the subject disclosure.

FIG. 1 illustrates an example wireless communication system 100 in accordance with various aspects and embodiments of the subject technology. In one or more embodiments, the system 100 can comprise one or more user equipment, e.g., UEs 102(1)-102(n).

In various embodiments, the system 100 is or comprises a wireless communication network serviced by one or more wireless communication network providers. In example embodiments, a UE 102 can be communicatively coupled to the wireless communication network via a network node 104. The network node (e.g., network node device) can communicate with the user equipment (UE), thus providing connectivity between the UE and the wider cellular network.

In example implementations, each UE such as the UE 102(1) is able to send and/or receive communication data via a wireless link to the network node 104. The dashed arrow lines from the network node 104 to the UE 102 represent downlink (DL) communications and the solid arrow lines from the UE 102 to the network nodes 104 represents uplink (UL) communications.

The system 100 can further include one or more communication service provider networks 106 that facilitate providing wireless communication services to various UEs, including UES 102(1)-102(n), via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

In FIG. 1, as described herein, a user equipment (e.g., 102(1)) is configured (block 110) to use a supplementary uplink carrier for uplink data transmissions 112, as paired with an otherwise orphaned downlink carrier for downlink data transmissions 114. As described herein, the uplink and downlink bands can be configured for the time division duplex mode of operation, even though they are frequency separated.

Figure 2:
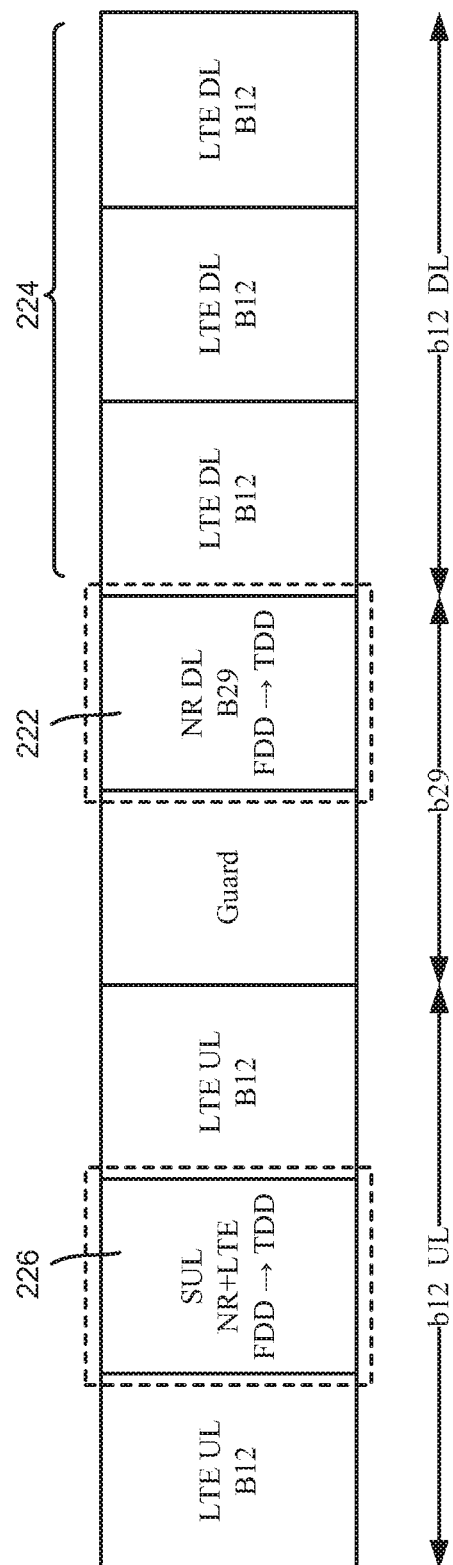
FIG. 2 illustrates an example of using a band as a supplemental band for uplink transmissions, and a frequency-separated band for downlink transmissions, using time division duplex transmissions, in accordance with various aspects and implementations of the subject disclosure.

By way of example, as represented in FIG. 2 a first New Radio carrier/band 222 is deployed (e.g., in band b29) adjacent frequency division duplex LTE downlink carriers 224 in band b12. Accordingly, the possibility of out-of-band interference prevents time division (downlink and uplink) operation in the band 222.

As described herein, to provide uplink resources, a second New Radio band 226 with uplink resources is utilized. This second band is configured as a supplementary uplink carrier and can be shared with FDD LTE uplink transmissions. The dashed boxes in FIG. 2 highlight the downlink and uplink pairing between the New Radio bands 222 and 226, respectively.

Figure 3:
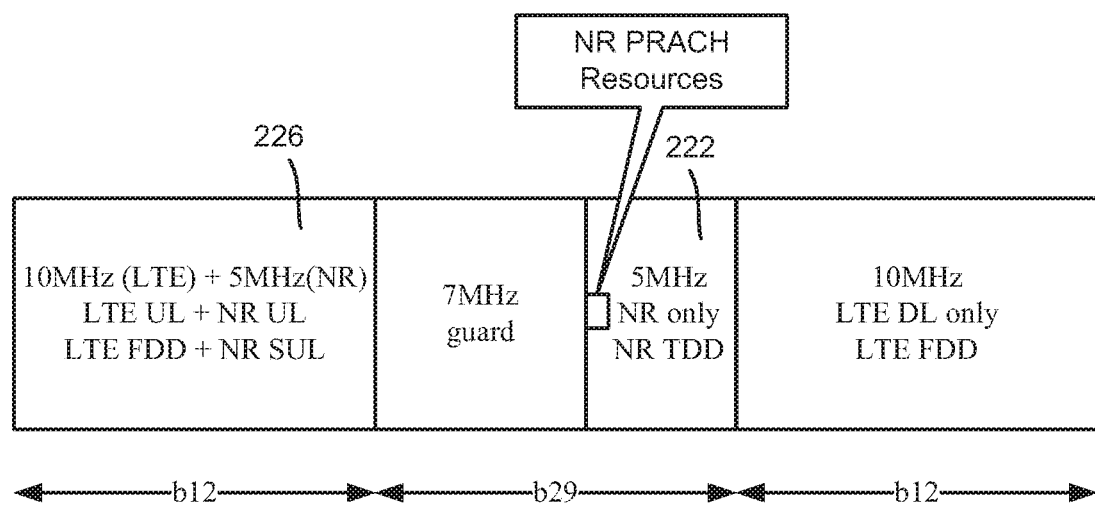
FIG. 3 illustrates an example of using a band as a supplemental band for uplink transmissions, and a frequency-separated band for downlink transmissions and initial uplink communications, using time division duplex transmissions, in accordance with various aspects and implementations of the subject disclosure.

FIG. 3 details the example of FIG. 2, in which the first (downlink) New Radio carrier 222 is configured as a 5 MHz New Radio time division duplex carrier, maintaining the guard to the b12 uplink band. Note that the New Radio physical random access channel (PRACH) bandwidth part is configured at the edge of the carrier 222, e.g., almost in the middle of the band b29 in order provide sufficient guard to the LTE DL in b12. Note that the carrier 222 has to be configured as TDD (according to New Radio specifications), and except for the New Radio PRACH, there is no actual uplink transmission in this band; (and New Radio PRACH resources are configured with sufficient guard to the LTE downlink in band b12).

Figure 4:
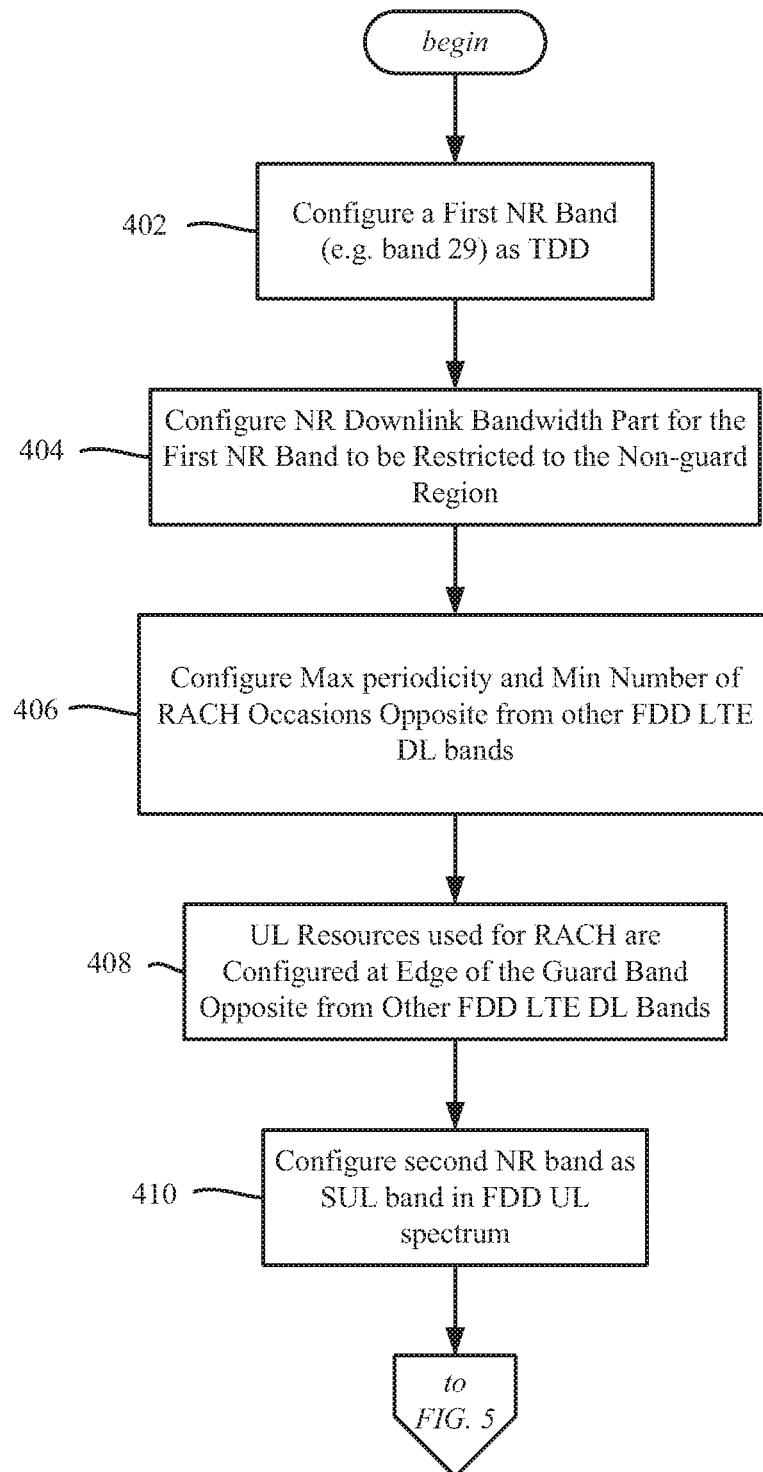
FIGS. 4 and 5 illustrate an example flow diagram of network device operations for configuring frequency-separated downlink and supplementary uplink bands for use with time division duplex transmissions, in accordance with various aspects and implementations of the subject disclosure.
Figure 5:
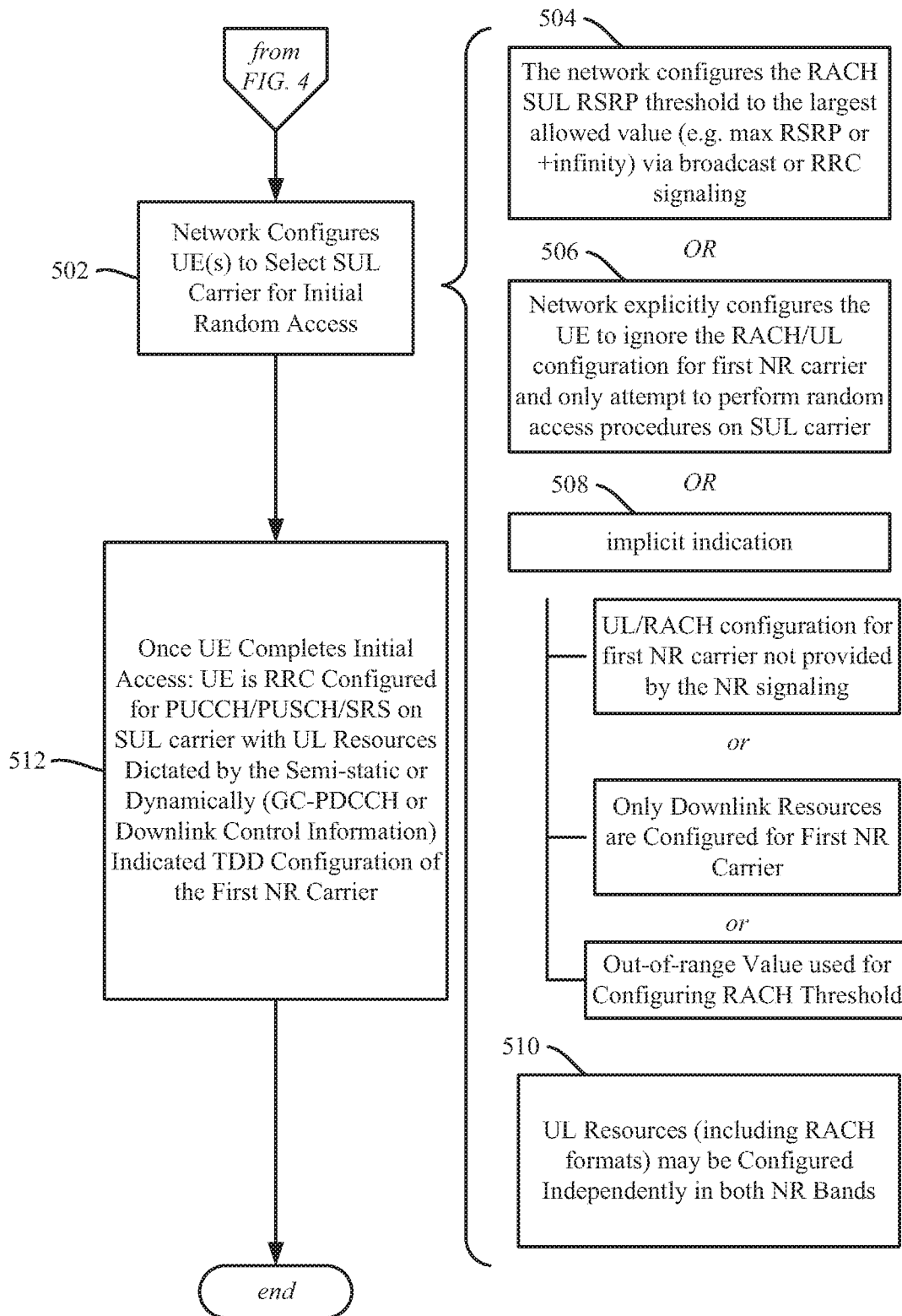

FIGS. 4 and 5 comprises a flow diagram that generally summarizes some example operations of a network node with respect to the technology described herein. Operation 402 represents the network configuring a first New Radio band (e.g. band 29 as in FIGS. 2 and 3) as time division duplex. As detailed in operation 404, the network configures the New Radio downlink bandwidth part for the first New Radio band to be restricted to the non-guard region, to avoid interference with the frequency division duplex uplink bands. Note that the New Radio uplink bandwidth part can be configured with the entire carrier bandwidth, however only uplink resources used for random access channel communications are configured at the edge of the guard band.

The semistatic remaining minimum system information time division duplex configuration for random access channel on the first New Radio band needs to also contain (a minimum number of) uplink symbols available. This can be accomplished at operation 406 by the network configuring the maximum periodicity and minimum number of random access channel occasions (e.g. a few PRBs), placing them at the opposite edge of the first New Radio band (e.g. in the guard next to b12) from the other frequency division duplex LTE downlink bands (operation 408).

Operation 410 represents configuring a second New Radio band as a supplementary uplink band in the frequency division duplex uplink spectrum. This corresponds to the band 226 in the example of FIGS. 2 and 3.

Once configured, at operation 502 of FIG. 5, the network configures/instructs the user equipment(s) to select the supplementary uplink carrier for initial random access. There are various alternatives to accomplish operation 502.

One alternative (block 504) is to configure the random access channel supplementary uplink carrier reference signal received power (RSRP) threshold to the largest allowed value (e.g., a maximum RSRP or positive infinity) via broadcast or radio resource control (RRC) signaling. This ensures that except for extreme cases (e.g., when the user equipment is right under the gNB) the user equipments select the supplementary uplink (e.g. b12) carrier for their initial random access according to an independently configured RACH configuration for the supplementary uplink carrier.

In another alternative, represented by block 506, the network may explicitly configure the user equipment to ignore the random access channel/uplink configuration for the first New Radio carrier entirely, and only attempt to perform random access procedures on the supplementary uplink carrier.

In yet another alternative, represented by block 508 an implicit indication may be provided. Examples of implicit indications include the user equipment by default knowing to use the supplementary uplink carrier if the uplink/random access channel configuration for the first New Radio carrier is not provided by the New Radio signaling, or if only downlink resources are configured for the first New Radio carrier (or if reserved). Another implicit instruction is when an out-of-range value is used for configuring the random access channel threshold.

Note that as represented via block 510, the uplink resources (including RACH formats) may be configured independently in both NR bands (e.g. configuring short uplink in b29 and long uplink in b12).

As presented in FIG. 5 via block 512, once the user equipment completes the initial access procedures, the user equipment is radio resource control configured for PUCCH/PUSCH/SRS (physical uplink control channel, physical uplink shared channel/SRS Sounding Reference Signal) communications on the supplementary uplink carrier with the uplink resources dictated by the semi-static or dynamically (GC-PDCCH or Downlink Control Information, DCI) indicated time division duplex configuration of the first New Radio carrier. In the situation in which the b12 supplementary uplink carrier is shared with LTE, the appropriate semi-static coordination of uplink resources between the New Radio gNB and LTE eNB also may be applied. Further, both non-standalone (e.g. RRC) and standalone (RMSI)

based configuration of the supplementary uplink parameters may be utilized by the network.

Figure 6:
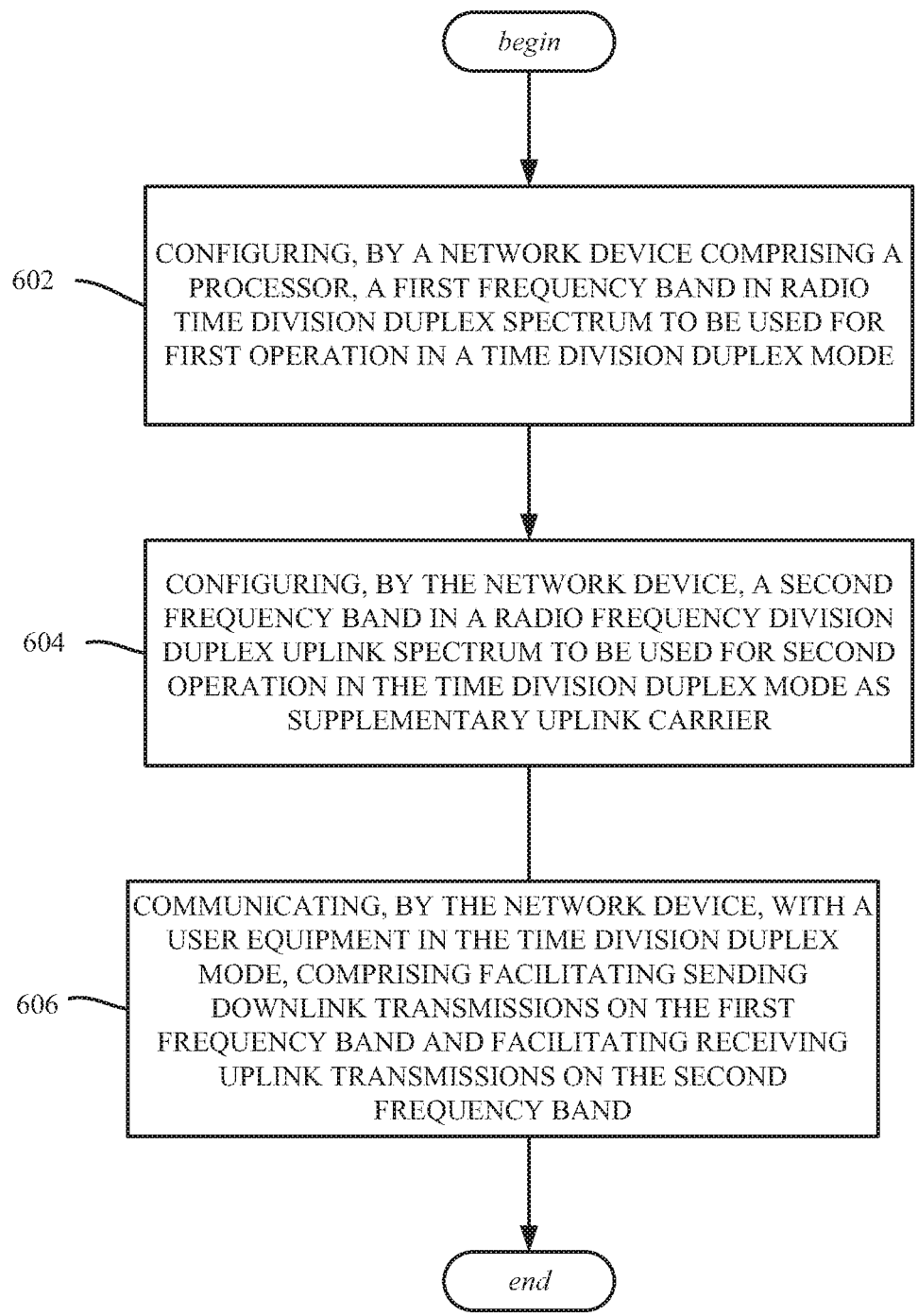
FIG. 6 illustrates an example flow diagram of aspects of network device operations, in accordance with various aspects and implementations of the subject disclosure.

One or more aspects, generally represented in FIG. 6, represent example operations comprising configuring (operation 602), by a network device comprising a processor, a first frequency band in radio time division duplex spectrum to be used for first operation in a time division duplex mode. Operation 604 represents configuring, by the network device, a second frequency band in a radio frequency division duplex uplink spectrum to be used for second operation in the time division duplex mode as supplementary uplink carrier. Operation 606 represents communicating, by the network device, with a user equipment in the time division duplex mode, comprising facilitating sending downlink transmissions on the first frequency band and facilitating receiving uplink transmissions on the second frequency band.

Configuring the first frequency band can comprise restricting a new radio downlink bandwidth part to a non-guard region of the first frequency band.

One or more aspects can comprise configuring, by the network device, uplink resources for the user equipment used for random access channel communications in a non-guard region of the first frequency band at an edge of a guard region.

Other aspects can comprise configuring, by the network device, the user equipment to use the second frequency band to send the uplink transmissions. Configuring the user equipment to use the second frequency band to send the uplink transmissions can comprise setting a random access channel supplementary uplink radio signal received power threshold value to a maximum allowed value. Configuring the user equipment to use the second frequency band to send the uplink transmissions can comprise facilitating sending an explicit indication to the user equipment to use the second frequency band to send the uplink transmissions. Configuring the user equipment to use the second frequency band to send the uplink transmissions can comprise implicitly indicating to the user equipment to use the second frequency band to send the uplink transmissions. Configuring the user equipment to use the second frequency band to send the uplink transmissions can comprise setting a random access channel supplementary uplink radio signal received power threshold value to an out-of-range value.

Figure 7:
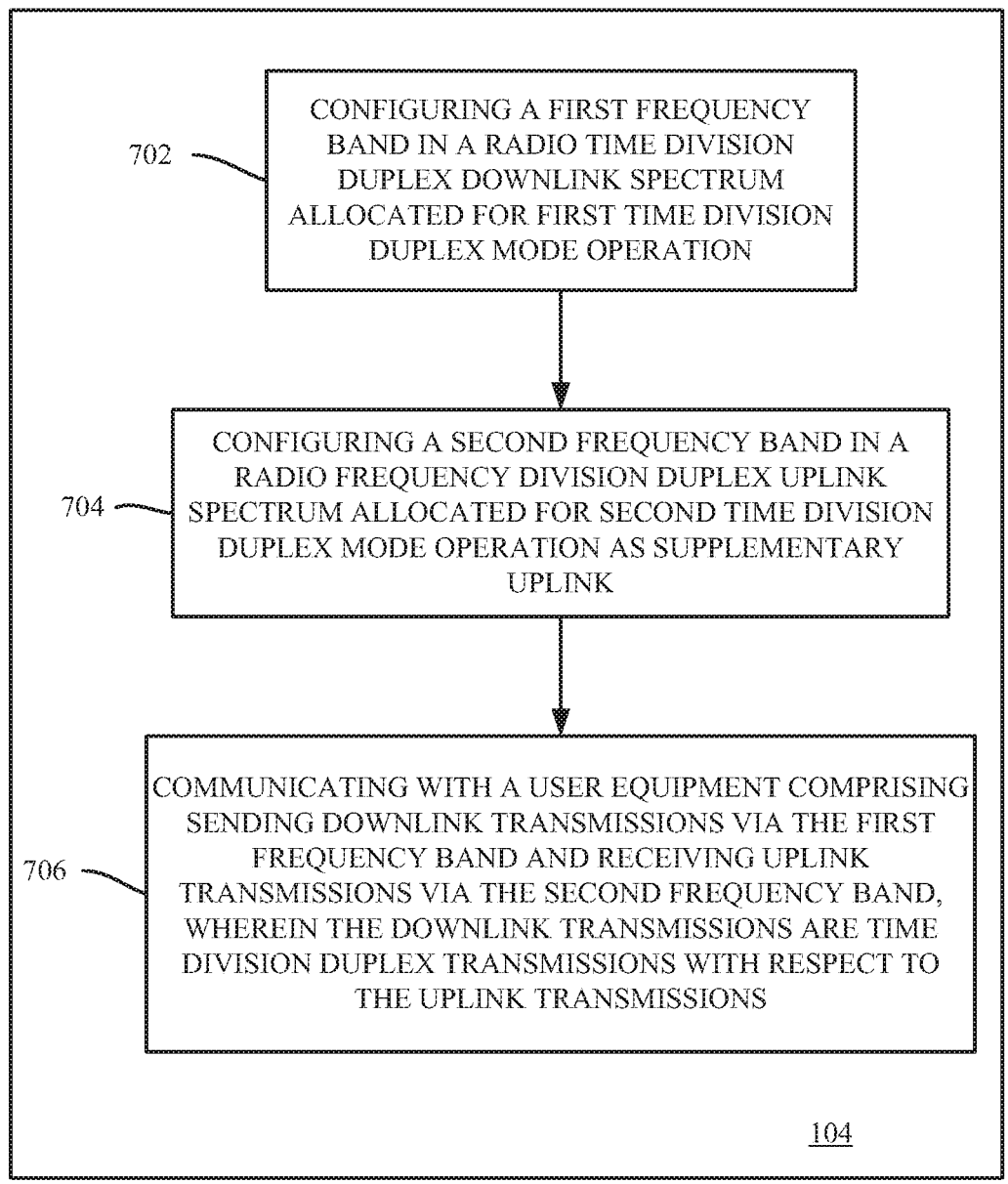
FIG. 7 illustrates an example flow diagram of aspects of network device operations, in accordance with various aspects and implementations of the subject disclosure.

One or more aspects are directed towards example operations of a network device 104 as generally represented in FIG. 7, e.g., executed via a network device processor based on a memory that stores executable instructions that, when executed by the processor, facilitate performance of the operations. Operation 702 represents configuring a first frequency band in a radio time division duplex spectrum allocated for first time division duplex mode operation. Operation 704 represents configuring a second frequency band in a radio frequency division duplex uplink spectrum allocated for second time division duplex mode operation as supplementary uplink. Operation 706 represents communicating with a user equipment comprising sending downlink transmissions via the first frequency band and receiving uplink transmissions via the second frequency band, wherein the downlink transmissions are time division duplex transmissions with respect to the uplink transmissions.

One or more aspects can comprise configuring the user equipment to operate in a time division duplex mode.

Configuring the first frequency band can comprise restricting a new radio downlink bandwidth part to a non-guard region of the first frequency band, and further comprising, configuring uplink resources for the user equipment to be used for random access channel communications in the non-guard region of the first frequency band at an edge of a guard region of the first frequency band.

One or more aspects can comprise configuring the user equipment to use the second frequency band for transmission of uplink transmissions. Configuring the user equipment to use the second frequency band for the transmission of the uplink transmissions can comprise setting a random access channel supplementary uplink radio signal received power threshold value to a maximum allowed value. Configuring the user equipment to use the second frequency band for the transmission of the uplink transmissions can comprise providing an explicit indication to the user equipment to use the second frequency band for the transmission of uplink transmissions. Configuring the user equipment to use the second frequency band for the transmission of uplink transmissions can comprise implicitly indicating to the user equipment to use the second frequency band for the transmission of uplink transmissions. Configuring the user equipment to use the second frequency band for the transmission of uplink transmissions can comprise setting the random access channel communications supplementary uplink radio signal received power threshold value to an out-of-range value.

Figure 8:
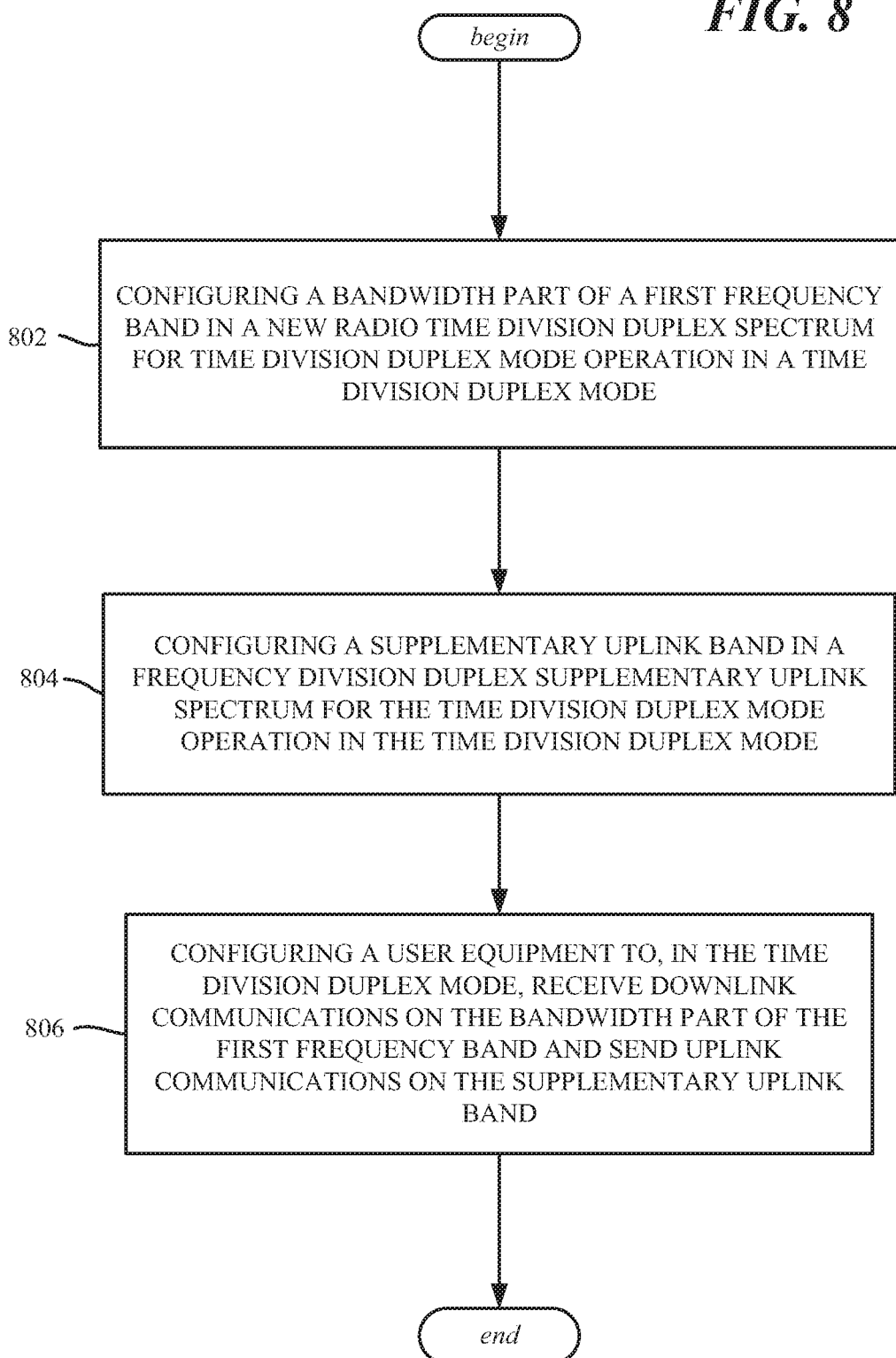
FIG. 8 illustrates an example flow diagram of aspects of network device operations, in accordance with various aspects and implementations of the subject disclosure.

FIG. 8 represents example operations, including operation 802, which represents configuring a bandwidth part of a first frequency band in a new radio time division duplex spectrum for time division duplex mode operation in a time division duplex mode. Operation 804 represents configuring a supplementary uplink band in a frequency division duplex supplementary uplink spectrum for the time division duplex mode operation in the time division duplex mode. Operation 806 represents configuring a user equipment to, in the time division duplex mode, receive downlink communications on the bandwidth part of the first frequency band and send uplink communications on the supplementary uplink band.

Configuring the bandwidth part of the first frequency band can comprise restricting the bandwidth part to a non-guard region of the first frequency band, and configuring the user equipment comprises configuring uplink resources for the user equipment used for random access channel communications in the non-guard region of the first frequency band at an edge of a guard region.

Configuring the user equipment to send uplink communications on the supplementary uplink band can comprise setting a random access channel supplementary uplink radio signal received power threshold value to a maximum allowed value. Configuring the user equipment to send uplink communications on the supplementary uplink band can comprise providing an explicit indication to the user equipment to send the uplink communications on the supplementary uplink band.

As can be seen, the technology describe herein achieves operation of supplementary uplink for New Radio, including with LTE coexistence in the frequency division duplex spectrum. The technology pairs an uplink carrier with an orphaned downlink spectrum carrier. The only uplink communications in the downlink band are minimal resources at the edge of band used for RACH control signaling, not data transmission. Once configured, the user equipment only selects the supplementary uplink band for uplink data transmissions. Further, although operating to an extent as frequency division duplex because of the different uplink and downlink frequencies, the transmissions are time division duplex to provide for efficient use of resources (e.g., time slots).

Figure 9:
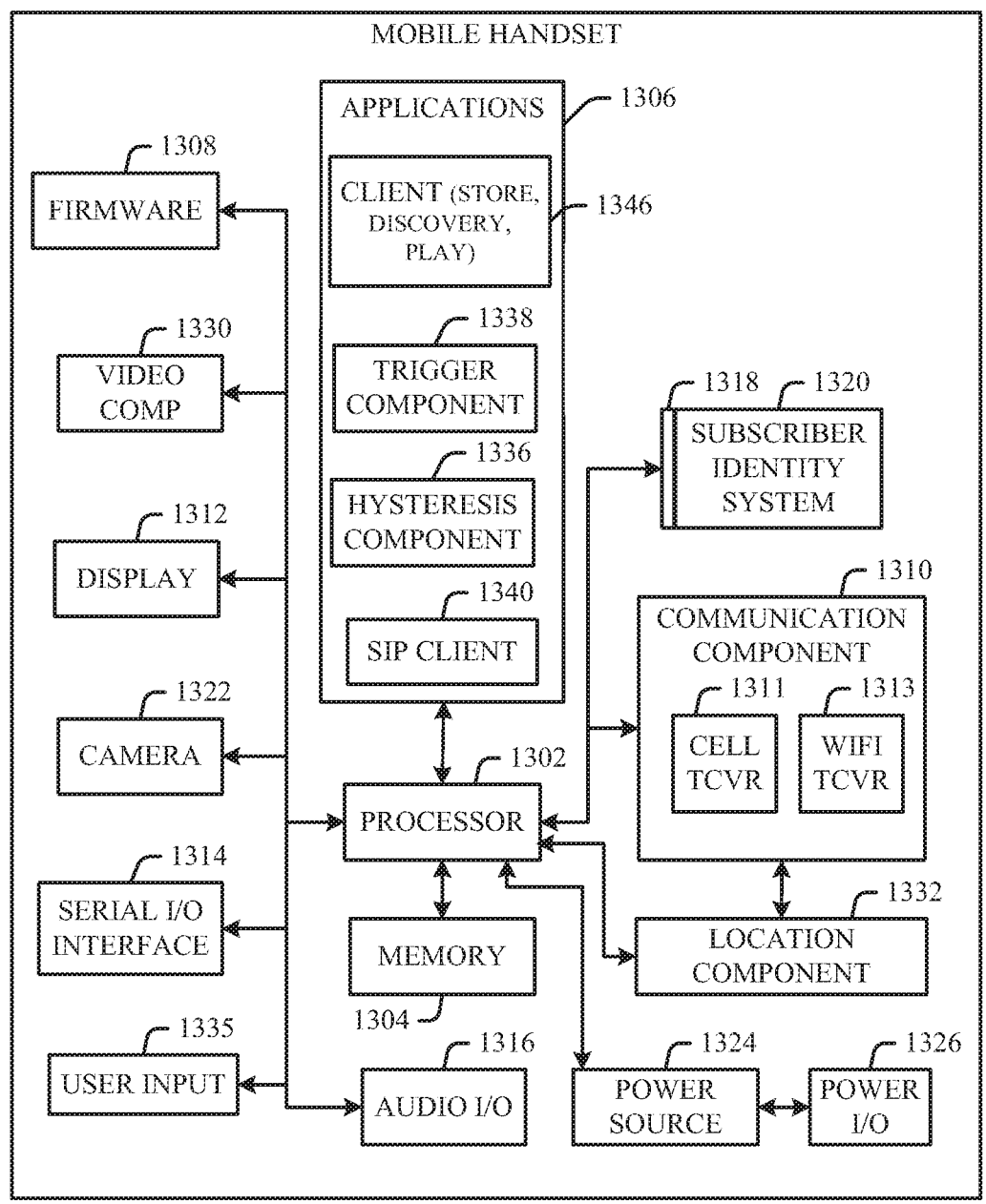
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
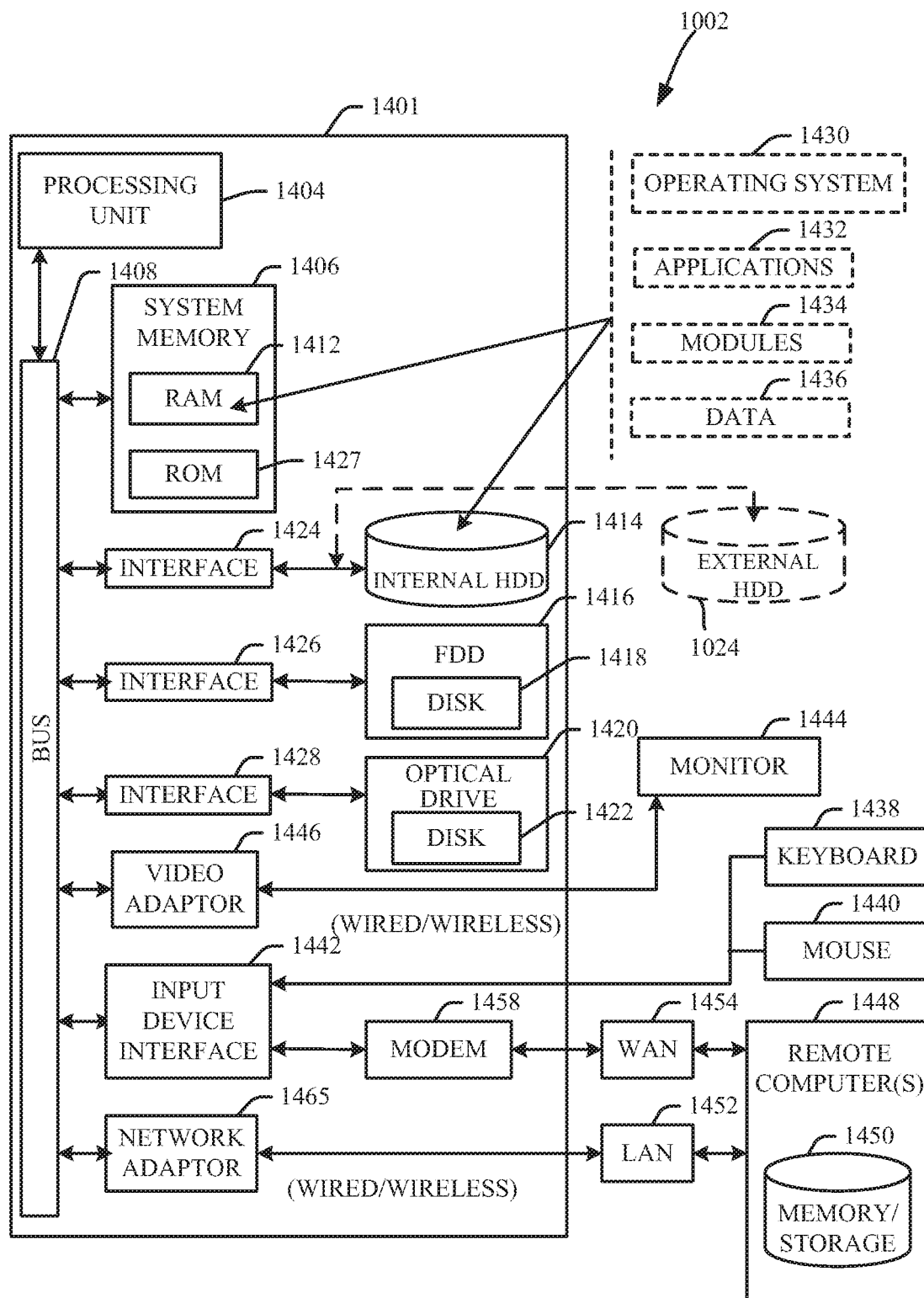
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 10 is but one example of a computing device.

In order to provide a context for the various aspects of the disclosed subject matter, FIG. 10 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of system 1020, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1094), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 and a move use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
configuring, by a network device comprising a processor, in a time division duplex mode, a user equipment to use a second frequency band in a radio frequency division duplex uplink spectrum as a supplementary uplink carrier to send uplink transmissions by using an implicit indication that comprises configuring only downlink resources on a first frequency band in a radio time division duplex spectrum; and
communicating, by the network device, with the user equipment in the time division duplex mode, comprising facilitating sending downlink transmissions on the first frequency band and facilitating receiving the uplink transmissions on the second frequency band.

2. The method of claim 1, further comprising restricting, by the network device, a new radio downlink bandwidth part to a non-guard region of the first frequency band.

3. The method of claim 1, further comprising configuring, by the network device, uplink resources for the user equipment used for random access channel communications in a non-guard region of the first frequency band at an edge of a guard region.

4. The method of claim 1, wherein the using the implicit indication further comprises setting a random access channel supplementary uplink radio signal received power threshold value to a maximum allowed value.

5. The method of claim 1, wherein the configuring the user equipment to use the second frequency band to send the uplink transmissions further comprises facilitating sending an explicit indication to the user equipment to use the second frequency band to send the uplink transmissions in response to determining that the user equipment did not recognize the implicit indication.

6. The method of claim 1, wherein the using the implicit indication further comprises not providing a random access channel configuration via the first frequency band.

7. The method of claim 1, wherein the using the implicit indication further comprises setting a random access channel supplementary uplink radio signal received power threshold value to an out-of-range value.

8. A network device, comprising:
a processor; and
a memory that stores executable instructions that, when executed by the processor, facilitate performance of operations, the operations comprising:
configuring, in a time division duplex mode, a user equipment to use a second frequency band in a radio frequency division duplex uplink spectrum as a supplementary uplink carrier to send uplink transmissions by using an implicit indication that comprises configuring only downlink resources on a first frequency band in a radio time division duplex spectrum; and
communicating with the user equipment in the time division duplex mode, comprising facilitating sending downlink transmissions on the first frequency band and facilitating receiving the uplink transmissions on the second frequency band.

9. The network device of claim 8, wherein the operations further comprise restricting a new radio downlink bandwidth part to a non-guard region of the first frequency band.

10. The network device of claim 8, wherein the operations further comprise configuring uplink resources for the user equipment used for random access channel communications in a non-guard region of the first frequency band at an edge of a guard region.

11. The network device of claim 8, wherein the using the implicit indication further comprises setting a random access channel supplementary uplink radio signal received power threshold value to a maximum allowed value.

12. The network device of claim 8, wherein the configuring the user equipment to use the second frequency band to send the uplink transmissions further comprises facilitating sending an explicit indication to the user equipment to use the second frequency band to send the uplink transmissions in response to determining that the user equipment did not recognize the implicit indication.

13. The network device of claim 8, wherein the using the implicit indication further comprises not providing a random access channel configuration via the first frequency band.

14. The network device of claim 8, wherein the using the implicit indication further comprises setting a random access channel supplementary uplink radio signal received power threshold value to an out-of-range value.

15. A non-transitory machine-readable medium, comprising executable instructions that, when executed by a processor of a network device, facilitate performance of operations, the operations comprising:
configuring, in a time division duplex mode, a user equipment to use a second frequency band in a radio frequency division duplex uplink spectrum as a supplementary uplink carrier to send uplink transmissions by using an implicit indication that comprises configuring only downlink resources on a first frequency band in a radio time division duplex spectrum; and
communicating with the user equipment in the time division duplex mode, comprising facilitating sending downlink transmissions on the first frequency band and facilitating receiving the uplink transmissions on the second frequency band.

16. The non-transitory machine-readable medium of claim 15, wherein the operations further comprise restricting a new radio downlink bandwidth part to a non-guard region of the first frequency band.

17. The non-transitory machine-readable medium of claim 15, wherein the operations further comprise configuring uplink resources for the user equipment used for random access channel communications in a non-guard region of the first frequency band at an edge of a guard region.

18. The non-transitory machine-readable medium of claim 15, wherein the using the implicit indication further comprises setting a random access channel supplementary uplink radio signal received power threshold value to a maximum allowed value.

19. The non-transitory machine-readable medium of claim 15, wherein the configuring the user equipment to use the second frequency band to send the uplink transmissions further comprises facilitating sending an explicit indication to the user equipment to use the second frequency band to send the uplink transmissions in response to determining that the user equipment did not recognize the implicit indication.

20. The non-transitory machine-readable medium of claim 15, wherein the using the implicit indication further comprises not providing a random access channel configuration via the first frequency band.

\* \* \* \* \*